Feb. 4, 1941.  E. E. WEMP  2,230,520
ENERGIZING CLUTCH
Filed Oct. 14, 1938   5 Sheets-Sheet 1

INVENTOR.
Ernest E. Wemp
BY Barnes, Kisselle, Laughlin & Raisch
ATTORNEY.

Feb. 4, 1941.　　　E. E. WEMP　　　2,230,520
ENERGIZING CLUTCH
Filed Oct. 14, 1938　　　5 Sheets-Sheet 2

INVENTOR.
Ernest E. Wemp
BY Barnes, Kisselle, Laughlin & Raisch
ATTORNEY.

Feb. 4, 1941.  E. E. WEMP  2,230,520
ENERGIZING CLUTCH
Filed Oct. 14, 1938  5 Sheets-Sheet 3

INVENTOR.
Ernest E. Wemp
BY Barnes, Kisselle, Laughlin & Raisch
ATTORNEYS

Feb. 4, 1941.  E. E. WEMP  2,230,520
ENERGIZING CLUTCH
Filed Oct. 14, 1938  5 Sheets-Sheet 4

INVENTOR.
Ernest E. Wemp
BY Barnes, Kisselle, Laughlin & Raisch
ATTORNEYS

Feb. 4, 1941.  E. E. WEMP  2,230,520
ENERGIZING CLUTCH
Filed Oct. 14, 1938   5 Sheets-Sheet 5

INVENTOR.
Ernest E. Wemp.
BY Barnes, Kisselle, Laughlin & Raisch
ATTORNEY.

Patented Feb. 4, 1941

2,230,520

UNITED STATES PATENT OFFICE 2,230,520

ENERGIZING CLUTCH

Ernest E. Wemp, Detroit, Mich.

Application October 14, 1938, Serial No. 234,981

50 Claims. (Cl. 192—68)

This invention relates to friction pressure devices such as clutches and brakes and has to do particularly with a clutch and brake having self-energizing properties; that is to say a device which obtains at least some of its torque capacity by reason of the torque transmitted. More specifically, the invention is directed toward the provision of a device of this type useful for automotive vehicles, although, of course, the invention is not limited to such use. This application is a continuation in part of application Serial No. 112,913 filed Nov. 27, 1936, which is a continuation in part of application Serial No. 100,605, filed September 14, 1936.

One of the principal objects of the invention is to provide a clutch which can be released with a minimum of effort on the part of the operator. As is well known to those versed in the art, it has been quite common in years past to provide a clutch engaged by spring pressure, and the release of such a clutch is accomplished by overcoming the springs. Relatively high total spring pressure is required in this type of clutch to handle the torque output of the engine and the kinetic energy, and of course this spring pressure must be overcome by the action of the operator, as for example, by depressing the clutch pedal. In one of my prior patents a structure is shown by which the effort required on the part of the operator is materially reduced, this clutch incorporating a spring factor and a centrifugal force factor properly coordinated to give the requisite clutch action.

The present invention contemplates a clutch wherein springs may be used for packing the clutch together but which may be exceedingly light as compared to a clutch using springs only, and wherein the construction is such that it is self-energizing, to the end that the packing pressure, and the resultant torque capacity, is increased by reason of the torque transmitted. It is a further object of the invention to provide a clutch of this type which will be silent in operation. In this regard it may be pointed out that certain clutch elements are capable of relative movement, the movement being in one direction when the torque is one way and the movement reversing upon reversing of torque. Such relative movement of the parts may result in audible noises upon a sudden torque reversal or upon a series of torque reversals, and the clutch of this invention is so arranged as to prevent the occurrence of any such noises and to the obtaining of a silent operation. The freedom of relative movement in the structure is a factor which may set up a high frequency vibration in some clutch parts under certain conditions, and the invention provides a dampening action, which may be a frictional dampener, for eliminating such vibration and resultant noises.

Another object of the invention is the provision of a brake which is self-energizing, to the end that the pressure which is exerted to obtain braking friction is obtained largely by reason of the torque transmitted from one braking member to another, or in other words, the torque absorbed by the device. The means for obtaining this self-energizing action in the brake employs the same principle as the means which furnishes the self-energizing action in the clutch. Accordingly, only a very small physical effort is required by an operator to initially apply the brake, whereupon the braking pressure is augmented by the self-energizing action to an extent which is under the control of the operator, depending upon the amount of physical effort expended.

These and other objects will be better understood as the detailed description progresses which may be considered in conjunction with the accompanying drawings.

The clutch structures will first be described in detail. The flywheel of an engine such as internal combustion engine of an automotive vehicle is illustrated at 1 which is mounted upon an engine crank shaft 2. A driven shaft 3 has one end piloted in the flywheel as at 4 and a driven member with a hub 5 has a spline connection with the driven shaft, as shown. This driven member may be of suitable design and as shown herein has friction facing material 6 secured to opposite sides of a disc 7. The disc body 7 is connected in driving relation with the hub and this may be accomplished through the means of a vibration dampening construction which may include coil springs 8 and other associated structure, the details of which need not further be considered. This driven disc structure, of course, may vary so far as the present invention is concerned, but the structure shown herein is outlined in more detail in Patent No. 2,042,570 of June 2, 1936.

Figure 1:
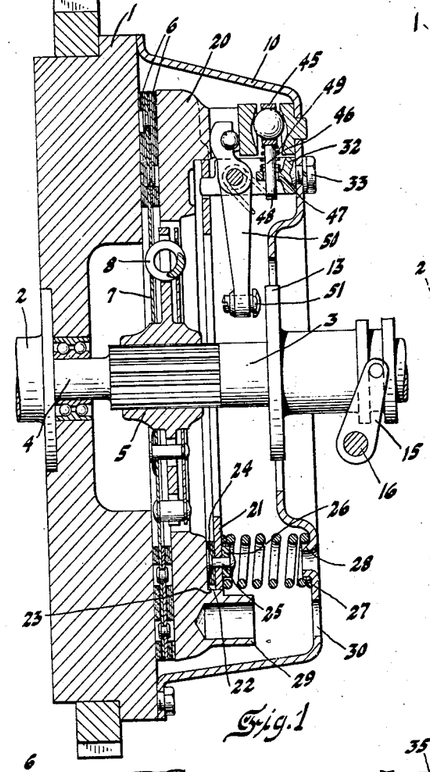
Fig. 1 is a cross-sectional view taken through a clutch constructed in accordance with the invention, the view being taken substantially on line 1—1 of Fig. 3, illustrating the clutch in a static or idling condition.
Figure 2:
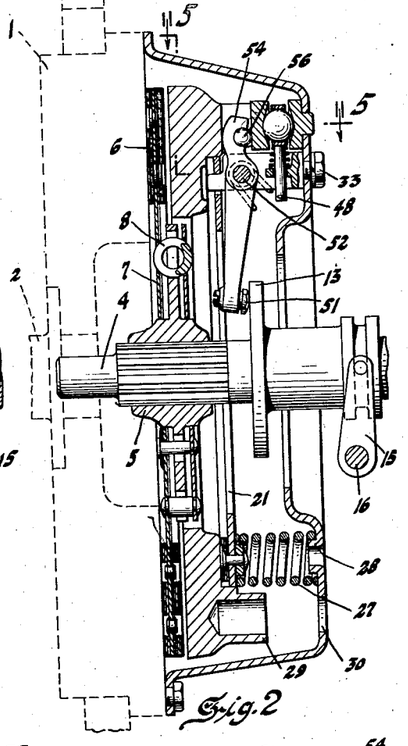
Fig. 2 is a similar cross-sectional view showing the clutch in released condition.
Figures 4, 5, 11:
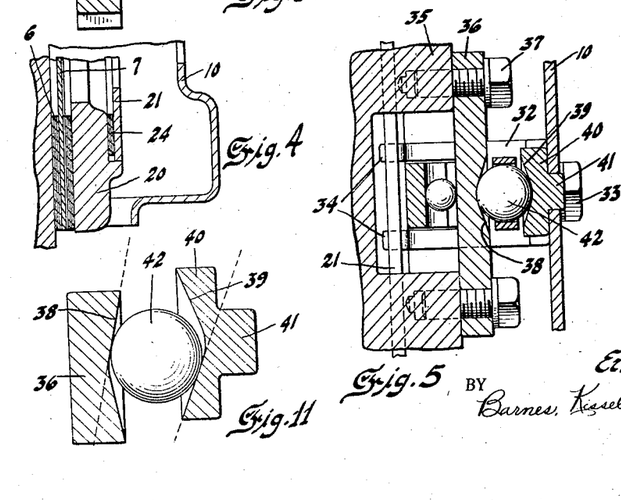
Fig. 4 is a cross sectional view taken substantially on line 4—4 of Fig. 3.
Fig. 5 is a cross sectional view taken substantially on line 5—5 of Fig. 2.
Fig. 11 is a diagrammatic view illustrating certain preferred ball seat angles.
Figure 6:
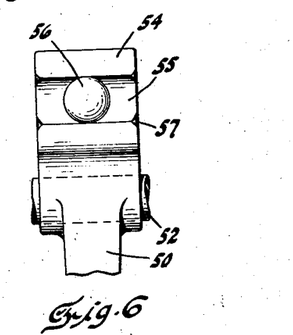
Fig. 6 is a detail view illustrating a lever and releasing bearing structure.
Figure 12:
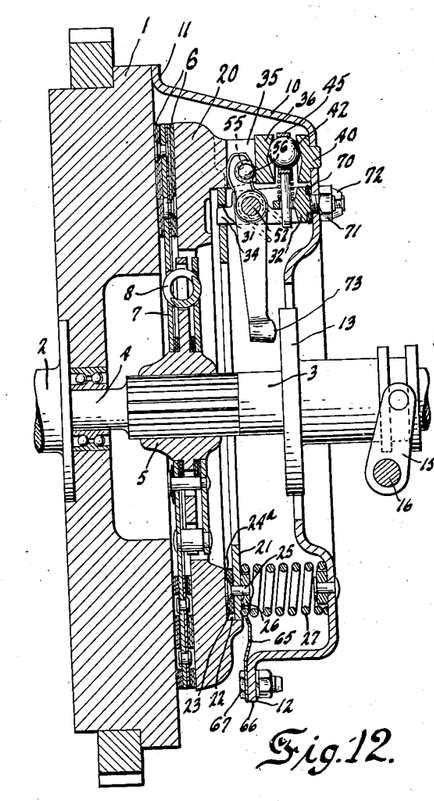
Fig. 12 is a view similar to Fig. 1 and taken on line 12—12 of Fig. 14 showing a modified form of the invention.

A cover plate for the clutch is illustrated at 10 having flanged portions 11 for attachment to the flywheel by cap screws or the like. This cover plate may take various forms, but as shown it is generally of triangular shape having chordal portions 12 which are arranged to bridge certain clutch parts as illustrated in Fig. 4. A clutch releasing structure may take the form of a clutch releasing bearing 13 which may incorporate an antifriction bearing arranged to be urged from right to left as Figs. 1 and 2 are viewed by an arm 14 secured to a clutch operating rock shaft 15, it being understood that this shaft 16 may be rocked by the usual clutch pedal or by a modification thereof, which is permissible by reason of the present clutch and which will presently be referred to.

Figures 3, 7, 8, 9, 10:
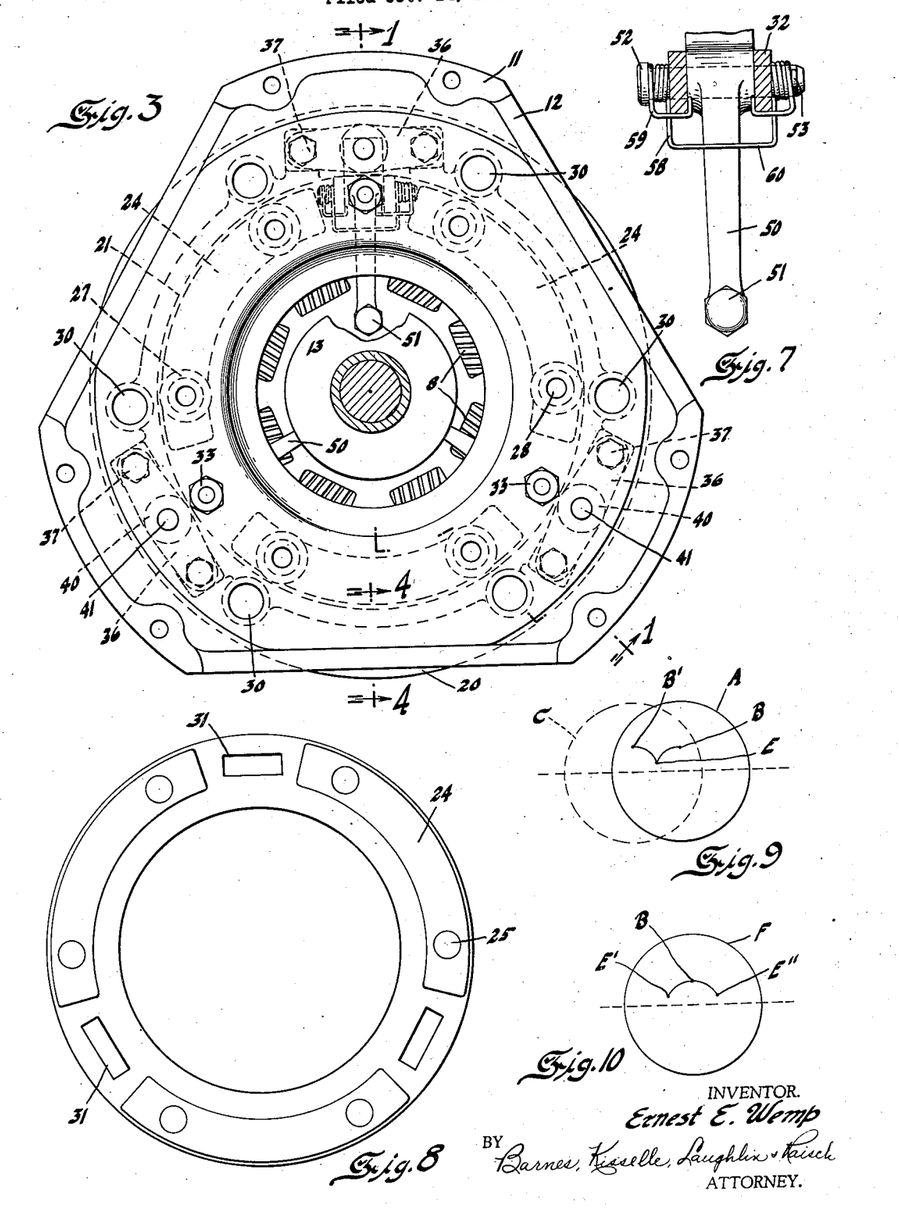
Fig. 3 is a rear elevational view of the clutch illustrating some of the parts underlying the cover plate in broken lines.
Fig. 7 is a detail view of a lever mounting.
Fig. 8 is a detail view illustrating a pilot and friction dampening member.
Fig. 9 is a diagrammatic view designed to illustrate relative movement of a ball and ball pocket members.
Fig. 10 is a diagrammatic view designed to illustrate the path of movement of the ball member relative to one pocket member.

A pressure plate is illustrated at 20 which is designed to be shifted axially for clutch control and which, in clutch engaged condition, shifts toward the left so that the driven disc is packed between the pressure plate and the face of the flywheel, the pressure plate and flywheel constituting driving members. This pressure plate is piloted on a pilot member 21 which is in the form of a ring as shown, the pressure plate having a recessed structure bounded by a wall 22 cooperating with the pilot ring. The pressure plate is provided with a friction face 23 for cooperation with friction material 24 which may be in the form of segments as shown in Fig. 8, secured to the ring by rivets 25, the rivets also serving to secure spring locators 26 to the ring. Clutch pressure springs 27 bear on the ring 21, the springs being located by the locators 26 and by struck-in parts 28 on the cover plate. As illustrated in Fig. 3 there may be six of such springs. The pressure plate may also have projecting portions thereon as at 29 arranged to substantially align with apertures 30 in the cover plate so that a boring tool may be passed therethrough for the purpose of drilling away metal in the projections 29 to balance the structure.

The ring 21 is mounted so that it is substantially non-rotatable with respect to the cover plate and therefore the flywheel. To this end the ring is provided with a series of apertures 31 for the reception of the ends of lever mounting yokes. In the form of clutch shown there are three lever mounting yokes 32 secured to the cover plate by nuts 33, the yokes being of bifurcated formation, as shown, and having ends 34 which lie in the apertures 31. In this way the pressure plate is piloted by the ring 21, held centered thereby, and yet the pressure plate and ring may be shifted axially, as the projecting ends 34 are so constructed to permit the plate to shift axially thereon.

The pressure plate and the cover plate are equipped with interassociated energizing mechanism generally taking the form of rolling elements pocketed between relatively inclined surfaces. To this end the pressure plate has projecting lugs 35, there being three pairs shown in the clutch illustrated, and across each pair is placed a ball seat plate 36 held to the lugs by cap screws 37. Each plate has a recess of conical form as illustrated at 38. A similar structure is on the cover plate and this may take the form of button-like elements 40 having reduced portions 41 press fitted into the cover plate, each button element having a conical recess 39. The recesses 38 and 39 are arranged in pairs, that is opposite each other, there being three pairs in the form shown, and between these matching recesses are ball elements 42, one ball between each pair of matching recesses.

Each ball is associated with a retainer member 45 having a stem 46 extending through an aperture 47 in a web of the yoke 32, the inner end being equipped with a cross pin or cotter key 48. A coil spring 49 is disposed between the web and the retainer element 45.

Clutch releasing levers, three in number in the form shown, are illustrated at 50, the inner ends of which are equipped with studs 51 which contact with the throw-out bearing 13, the studs being adjustable in initial assembly to bring them into a common plane. Each lever lies in a yoke 32 and is swivelled on a pin 52 which may have a head at one end as illustrated in Fig. 7 and a cotter key in the opposite end, as illustrated at 53. The levers have load ends 54 which lie inbetween the pressure plate and the socket plates 36. These ends of the levers may have a transverse groove 55 therein each for the reception of a ball element 56. Preferably the grooves extend around more than one-half of the diameter of the balls so as to retain the balls in position and the metal at the ends of the grooves may be peened over as at 57 to prevent the balls from passing out through the ends of the grooves. The balls 56 function on the back side of the plates 36, as illustrated in Figs. 1 and 2. Each lever may be equipped with an anti-rattle spring generally illustrated at 58 having portions coiled around the pivot pin 52, as shown in Fig. 7, with end portions 59 hooked under the bifurcated parts of the yoke and an intermediate portion 60 functioning on the lever. These springs normally tend to rock the levers clockwise on their pivots as the lever shown in Figs. 1 and 2 is viewed, thus holding the balls 56 in snug engagement with the back side of the plates 36.

The operation of the clutch, the function of various elements therein, the purpose of the provision of certain structural features, and the advantages and further objects of the invention may now be considered. Certain parts are preferably of metal such as hardened steel in order to do the work required of such parts, as for example, the energizing balls, the cone seats therefor, and also the releasing balls associated with the levers.

The entire assembly, exclusive of the flywheel and the driven disc, may be assembled as a unit in the form of a subassembly and then brought up against the flywheel so that the cover plate may be secured thereto. Now in such subassembly the pressure springs 27 tend to separate the pressure plate and the cover plate, but the releasing levers rock counterclockwise as Figs. 1 and 2 are viewed, and the inner portions of the levers strike the inner part of the back wall of the cover plate. This limits the separating tendency and keeps the friction controlling ring 21 in assembly on the projecting ends of the yokes. At this time also the cross pins or cotter keys on the stems of the ball retainers may contact with the webs of the yokes so as to retain the energizing balls in position, thus preventing the same from becoming detached or falling out of position.

When the clutch is in a static or non-rotating condition the parts may assume a condition substantially as shown in Fig. 1. The clutch is engaged at this time by reason of the packing springs. The mating cone seats for the energizing balls may at this time be aligned so that they are on a common center; on the other hand, they may not be on a common center because the pressure plate is rotatable, for such centering, with respect to the cover plate, only by overcoming the friction provided by the facings 24 under pressure of the springs 27. Assuming that the mating cone seats are on common centers the energizing balls will be in their outermost position. This is because the compression springs 49 around the stems of the ball retainers urge the balls into such position. Of course, this outermost position progresses outwardly as the friction facings on the driven disc wear and become thinner.

This position of the parts is substantially maintained when the clutch is rotated with no torque being transmitted therethrough, or substantially no torque, as is the case when the engine of an automotive vehicle is idling. There may be some shift of the pressure plate 20 relative to the cover plate of the flywheel as the engine is started, due to inertia, but once a substantially constant idling speed is reached the parts may remain substantially in a position as shown in Fig. 1.

The released condition of the clutch is illustrated in Fig. 2. The clutch may be released in a rather conventional manner by physical effort of an operator rocking the shaft 16 so that the throw-out bearing rocks the levers clockwise as Figs. 1 and 2 are viewed. In this action the balls 56 function on the plates 36 and retract the pressure plate. This retraction of the pressure plate releases the clutch and also causes a shift of the friction controlling ring and a compression of the springs 27. In this release the energizing balls are required to shift relative to the cone seats. The maximum amount of opening in the clutch may be that when the energizing balls are seated in the extreme bottom portions of mating cone ball seats. In other words, as the pressure plate is retracted from the Fig. 1 to the Fig. 2 position the cone seats exert a wedging or caming action on the balls and they are forced toward the center line of the cone seats as illustrated in Fig. 2.

When the clutch is to be engaged the throw-out bearing is retracted and the pressure springs advance the pressure plate so that the driven disc is packed between the pressure plate and the flywheel. When the driving parts are rotating and the driven disc is relatively stationary the friction on the pressure plate causes the same to rotate relative to the cover plate and flywheel. This action causes a disalignment of the mating cone seats. These cone seats constitute in effect universal cams. All the while the energizing balls are held outwardly by the compression springs 49 and as the cone seats disalign, the balls, with rolling action, shift along the surfaces of the mating cone seats and a wedging action takes place which forces the pressure plate forwardly and into tighter frictional engagement with the driven member. Thus the torque energizes the clutch and increases its torque capacity. The action is cumulative, and a high torque capacity is obtainable with minimum spring pressure. The clutch may be released at any time in the manner as above described by shifting the clutch throw-out bearing to rock the levers.

During the rotation of the parts centrifugal force tends to keep the energizing balls outwardly and into contact with opposing faces of the cone seats, as well as the springs 49. This positioning of the balls is an important matter because a clutch in an automotive vehicle is subject to torque reversal. It will be understood that a torque reversal would cause the pressure plate to shift relative to the cover plate in the reverse direction. Where the energizing balls are held outwardly in contact with the cam surfaces, the balls move, in such torque reversal, in a curved path, always remaining in contact with surfaces of the cone seats. As a result upon torque reversals the balls roll from one driving position to the other, and the wedging action of the balls between the inclined faces of the cone seats takes place more or less in a gradual manner. Thus torque reversal, sudden or otherwise, may be effected silently and without a bump so to speak. To further exemplify this action it may be said, and it is thought that this will be readily understood, that if the balls were not constrained outwardly but were relatively loose between the cone seats, that there would be a bumping action upon torque reversal as the pressure plate and cover plate shift rotatably relative to each other from one extreme position to the other. The balls may be visualized as moving, in this case, in a substantially straight line across the cone seats, and of course in the intermediate position they would be loose or disengaged from the seats. They would then be jammed in between the inclined surfaces of the cone seats with an impact which would suddenly stop rotation of the pressure plate relative to its associated driving member. In applicant's arrangement the balls are constrained away from the cone centers so that they are at all times in contact with the inclined surfaces and move from one extreme position to the other by rolling along the cone seat surfaces in a rather arcuate path. Since the balls are already in contact with the surfaces there is no impact and the balls are more or less wedged into position rather than suddenly jammed between the converging surfaces.

This ball movement is diagrammatically depicted in Figs. 9 and 10. In Fig. 9, for example, the full line illustration A represents the cone seats when they are in axial alignment. The point of contact of the ball with the cone seats may be represented by the point B. Assume now that the cone seats shift relatively, as for example, by the cone seat on the pressure plate shifting relative to that on the cover plate; one cone seat which may be visualized as remaining in position may still be represented at A and the one that is shifted represented by the dotted line illustration C. The ball may now be positioned so that it will contact with the cone seats at the point E. The point of contact of the ball with the cone seat represented at C was at the point B' when the cone seats were in alignment. In reaching the position E the ball rolled in a curved path along the surfaces of the cone seat represented at A, this curved path being illustrated in Fig. 9, from the point B to E. Similarly, the ball rolled along a curved path on the surface of the cone represented at C, the curved line being illustrated from the point B' to E. Should the torque be reversed the dotted line illustration would shift to the right relative to the full line illustration A instead of to the left as is shown, and the curved paths of the ball could be similarly illustrated. In Fig. 10 a single cone seat is represented at F, with the position of the ball in a static condition illustrated at the point B and the position of the ball in opposite extreme positions when the clutch is engaged, illustrated at E' and E''. With respect to the single cone seat it will be noted that the ball moves along a curved line as illustrated. These illustrations in Figs. 9 and 10 are diagrammatic only, designed to make the invention clear. The ball is at all times in contact with the inclined surfaces of the cone seats. Accordingly, when the balls jam or wedge between the cone seats in the extreme positions E' and E'', there is no bump or jolt because the balls are more or less gradually wedged into this position by reason of their constant contact with the cone seats. It will be understood that the positions E' and E'' vary as the clutch facings wear in use. The ball retainers and their stems are capable of being rocked or cocked relative to the yokes as the stems 46 are loose in the apertures 47 so that the balls may shift from one side to the other of the cone seats on the cover plate.

In releasing the clutch it will be noted that there will be a rotation of the pressure plate relative to the cover plate and therefore the clutch throw-out levers. This movement is taken care of by the balls 56, which can roll along the surfaces of the plates 36, each ball shifting in its groove 55.

It will also be observed that the pressure plate is mounted relative to the cover plate and clutch release levers in a substantially frictionless manner, save for the friction on the pressure plate caused by the packing springs and friction material 24. If the pressure plate be mounted in such a frictionless manner, a high frequency vibration may be set up in the pressure plate under some conditions of engagement resulting in objectionable noises. However, the friction on the pressure plate exerts a dampening action or a friction controlling action and eliminates this vibration condition. With this arrangement it will be noted that a frictional resistance must be overcome when the pressure plate shifts rotatably relative to the cover plate. This has a bearing on the torque capacity of the clutch, which will presently appear. This friction control of the pressure plate has another important function in that it stabilizes the rate of engagement and prevents torque surge.

A clutch constructed in accordance with this invention is preferably arranged so that the desired mechanical advantage is obtained by the energizing mechanism; that is the advantage which may be obtained through the inclined surfaces. This may be determined by the cotangent of the angle of the inclined faces of the cone balls seats. The true mechanical advantage is determined by the cotangent of the angle on the axes of the cones. It has been found that the mechanical advantage advantageously lies between the value of 2:1 and 3:1. In the mechanical advantages given above the angles of the ball seats are about 26° —30' and 18° —24' respectively. If the angle is made too small the mechanical advantage will be too great and the clutch may get out of control; one condition of being out of control is that it would not be possible to release the clutch without discontinuing the motivating power. Too great an angle would decrease the torque capacity. The amount of friction to be overcome in the rotation of the pressure plate relative to the cover plate necessitates the use of mechanical advantage sufficient to overcome such friction and obtain the requisite torque capacity. It has been found, however, that the mechanical advantage can be stepped up or adjusted to meet this frictional resistance without approaching ball seat angles which would be undesirable.

It is preferred that the angle of the cone surfaces of mating ball seats should not be the same. Where a pair of mating ball seats are perfectly positioned in parallel planes, the opposing inclined surfaces which function on the ball in the energizing action are parallel if the cone angles are the same. These opposing surfaces would be, for example, the surface on the upper half of the cone 38 and the surface on the lower half of the cone seat 39 or vice versa, as Fig. 5 is viewed. In the production of the clutch inaccuracies are liable to develop so that some of the mating ball seats will not be accurately positioned in parallel planes, and this may result in one or more balls wedging in position to energize the clutch before other balls are effective for this purpose. This may be termed a driving condition for the ball which is functioning. The other balls will then be loose between their ball seats; in other words they will not be exerting an axial force on the pressure plate to increase the packing pressure. Stated in another way they will not be in a driving condition. Bear in mind, however, that these balls which are not in a driving condition may be held snugly against the opposite ball seats by the springs 49 or by centrifugal force or both, but nevertheless these particular ball seats are capable of more angular movement before a wedging action takes place.

To meet this situation it is preferred that the cone angle of the mating ball seats should not be the same. It will at once be appreciated that if the cone angle of the cone 38 is different from that of cone 39 that the opposing surfaces effective upon the ball will not be parallel. Therefore, as soon as there is an initial relative angular movement between the mating ball seats all balls are at once in a driving condition as they are urged against the non-parallel surfaces by the springs. Even if one ball and its mating cone seats reach a maximum energizing position prior to the others, the others are still in a driving condition. This angular differential, however, should not exceed the angle of repose of the material used; for example, where steel is used the differential should not exceed about 7°, as this is about the angle of repose for steel, else the balls will slip down the slope under pressure and they will not be effective for driving or energizing purposes. The angles may be selected to get the desired mechanical advantage; as for example, if a mechanical advantage of 2.4:1 is desired the cone angle on one set of ball seats may be arranged to give a mechanical advantage of 2.6:1, while on the other set of ball seats the angle may be such as to give an advantage of 2.2:1. This gives an average of 2.4:1.

On this basis the differential amounts to only a few degrees, hardly visible in Figs. 1, 2 and 5. This, however, is shown in somewhat enlarged form in Fig. 11, where the differential is about 7°, and in this view the cone seats are shifted angularly as they will shift in the functioning of the clutch. It will be immediately noted that as Fig. 11 is viewed the upper portion of the surfaces of the cone 38 and the lower portion of the cone surface 39 are functioning on the ball with the ball pocketed therebetween and these are not parallel. The tendency in the energizing of the clutch is to force the balls to shift radially inwardly toward a line cutting through the apices of the cone seats; that is the center lines illustrated in a horizontal position in Figs. 9 and 10. But if the ball is caught between the non-parallel surfaces as illustrated in Fig. 11 the balls are in driving condition, and the balls will not be pushed toward the center line without exerting a driving condition so long as the angle differential does not exceed the angle of repose of the material used. The surfaces of the cone seats are projected by dotted lines in Fig. 11, and it will be noted how the ball is wedged inbetween the converging surfaces.

An important feature of the clutch lies in the fact that the torque capacity is entirely under the control of the operator up to the point where the clutch throw-out bearing releases the levers and the clutch packing springs fully exert their packing action. During the range of movement of the pressure plate in its fore and aft movement as controlled by the levers, the pressure plate can be energized only to that extent permitted by the lever position, and this is under the control of the operator. As a result, by proper manipulation of the clutch throw-out bearing through the pedal or other device used for this purpose, a nicety of operation may be effected.

The frictional dampening of the pressure plate has an effect, as above pointed out, on the torque capacity of the clutch since this friction has to be overcome when the pressure plate shifts rotatably for energizing purposes. In this regard an ideal friction material for this purpose is one which has a substantially constant coefficient of friction throughout the temperature range under which the clutch is to be operated, say for example, from —20° F. to 500° F. or over, and there should be little difference in the static and dynamic coefficient of friction, for the best operation. Note that this is specified as being an ideal friction material, but the invention, of course, is not limited to this ideal material. To illustrate the effect of the frictional dampening of the pressure plate on the energizing action: If the friction material has a high coefficient of friction when cold the torque capacity of the clutch will be lowered when cold; if the friction material has a relatively low coefficient of friction with a high temperature the torque capacity of the clutch will be increased at such higher temperature. If the friction material has a low coefficient of friction when cold and a high coefficient of friction when hot, the torque capacity is just the reverse. This is due to the fact that the frictional resistance to the rotation of the pressure plate governs or at least exerts a controlling action on the rotation of the pressure plate and the resulting energization.

With a clutch of this design the amount of packing pressure exerted by the springs 27 is no criterion by which the torque capacity of the clutch may be gauged. In fact, the greater the spring pressure the greater the frictional dampening action or frictional resistance to rotation of the pressure plate for energizing purposes, and the lower the spring pressure the lower the resistance. The effective increase of spring pressure may be substantially offset by the increase in the frictional resistance; a decrease of the spring pressure results in a lower frictional resistance, and such lower frictional resistance may offset the expected loss of torque capacity. However, it has been found in practice that a certain amount of spring pressure and frictional resistance to rotation of the pressure plate is necessary to make the clutch quiet under all conditions of operation. This is the factor which is more of a controlling one from the standpoint of what spring pressure is to be used. In other words, the torque capacity desired does not control the spring pressure to be used. Thus the spring pressure is no index to the torque capacity, and it is quite possible for the torque capacity of the clutch to increase rather than decrease as the friction facing on the driven member wear in use and cause a loss of spring pressure. On the other hand, the spring pressure may be lowered by the springs taking a set in use or by undue heating, but even under these conditions the torque capacity may increase rather than decrease. These nominal losses of spring pressure are therefore of no material importance from the standpoint of the torque capacity obtained.

As an example of how easy the clutch may be operated some spring pressures may be given for this clutch as compared to the spring pressures required in what may be termed a conventional clutch where spring pressure alone is relied upon for clutch engagement. A clutch built in accordance with this invention having a driven member with a 10 inch diameter and having a total spring pressure of between 250 to 300 pounds has a greater torque capacity than the so-called conventional clutch with a driven member 11 inches in diameter and with a spring pressure of 1330 pounds. Thus to release the clutch the operator only has to overcome the relatively low spring pressure of from 250 to 300 pounds instead of the spring pressure in the conventional clutch of about 1330 pounds. As a result the clutch pedal pressure, that is the pressure required to depress a clutch pedal to release the clutch, may be in the neighborhood of 8 to 10 pounds. In fact, it has been found that the usual clutch pedal requiring leg movement to release the clutch is not necessary and it has been demonstrated that it is feasible to use a so-called treadle built much like an ordinary accelerator used on automotive vehicles. Thus the clutch may be controlled in its release and engagement by the mere rocking of a treadle under relatively light pressure, with the foot of the operator rocking on the ankle joint. This materially reduces the work required on the part of the operator and makes clutch operation and gear changing simple and easily accomplished.

It will be understood that the torque capacity of the clutch as effected only by the pressure of the packing springs may be wholly insufficient to transmit the torque of the engine, to say nothing of the torque due to kinetic energy. However, as soon as the clutch is subjected to torque, whether coming from the engine or reversely from the driven shaft, the self-energizing feature increases the torque capacity so that the clutch will properly handle the load and so that there is no clutch slippage.

It is thought that the most practical construction of the ball seats is the full conical recess formation as shown and described herein. In the operation of the clutch the energizing balls function largely on only a portion of the seats on one side of a center line through the apices; therefore, the results of the invention may be obtained by using seats having functioning surfaces which are only a portion of or a segment of a cone. Where such terms as "cone" or "conical" or "conical surfaces" or similar terms are used herein, it is intended that such terms cover a construction having a portion only of a cone used for ball seats.

The modified form shown in Figs. 12 to 18 includes elements which, for the most part, are the same as the elements described in the foregoing form. These elements include such parts as the flywheel, cover plate, pressure plate, springs, etc., and the reference characters used on the foregoing form are again used for like parts on the modified form. Thus, a duplicate detail description is dispensed with.

Figure 14:
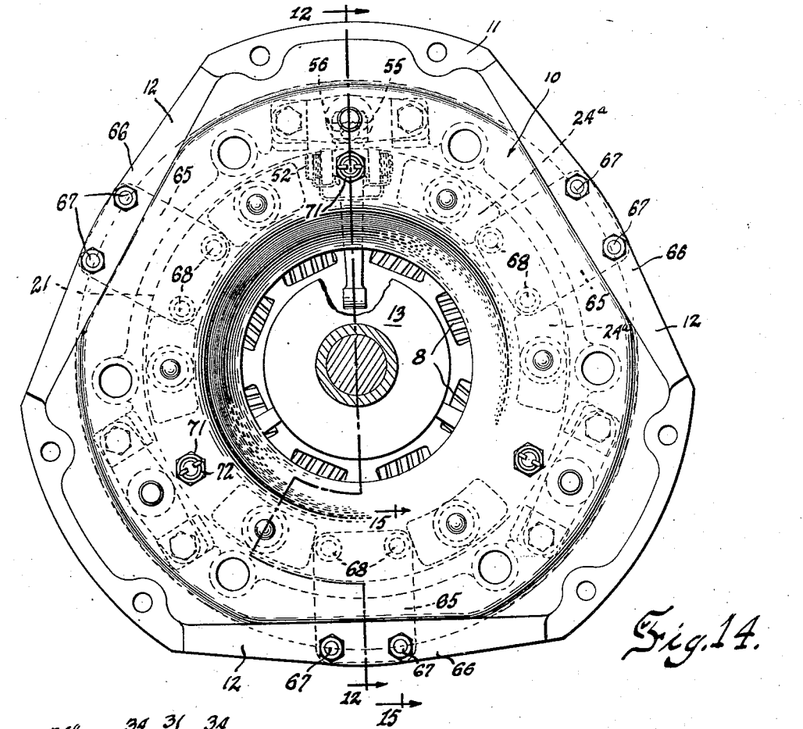
Fig. 14 is a rear elevational view showing some of the parts in broken lines which underlie the cover plate.
Figure 15:
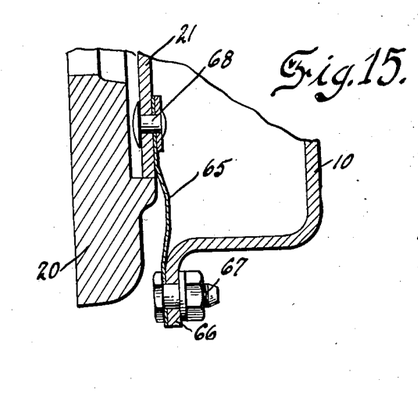
Fig. 15 is an enlarged detail view of the mounting for the pilot and dampening member and taken substantially on line 15—15 of Fig. 14.
Figure 16:
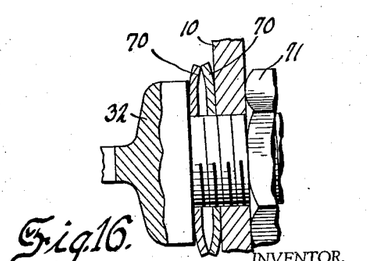
Fig. 16 is an enlarged detail view of the mounting of a yoke to the cover plate.

The principal variation in this modified form lies in the manner in which the pressure plate and the pilot or friction ring therefor are suspended, and held centered. In the form shown in Figs. 1 and 2 the pilot member 21 is mounted upon and is axially slidable on the ends of the yokes. In the modified form the pilot member is suspended and held centered, so that it may be shifted axially, by flexible sheet metal plates 65. The cover plate may have its outer flange somewhat widened as at 66 so that the plates may be secured thereto by means of bolts 67. There may be three of such plates, as illustrated in Fig. 14, these plates extending generally in a radial direction and their inner portions are secured to the pilot 21, as by means of rivets 68. These plates are slightly corrugated, or of wavy form, or provided with one or more depressions axially, which is the equivalent of corrugations, so that the over-all length of the plates is greater than the straight line distance between the bolts and rivets 67 and 68. This is for the purpose of permitting the pressure plate and pilot member 21 to shift axially relative to the cover plate, in which action these plates may lengthen or shorten by a flexing at the corrugated or depressed formation, whichever may be required. In other words, the rivets 68 are to shift axially in a straight line relative to the bolts 67 and the straight line distance between these points varies, and the depressed or corrugated formation of the plates accommodates for this condition. This slight difference can hardly be shown on the drawings.

Figure 13:
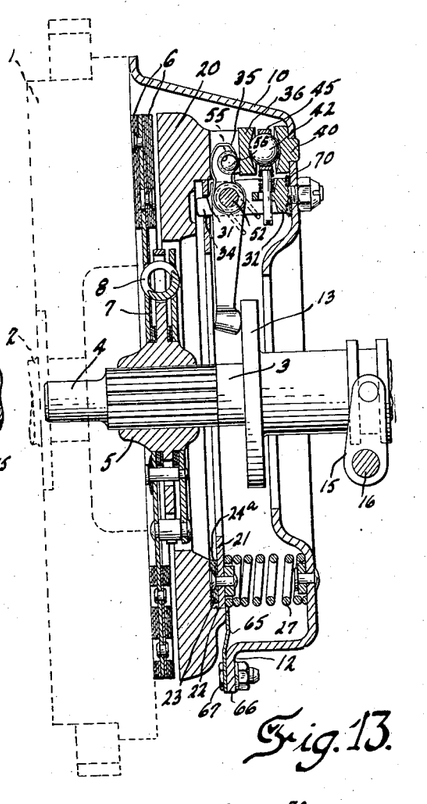
Fig. 13 is a cross sectional view similar to Fig. 12 showing the modified form with the clutch in released condition.

With this modified construction the pilot member may shift axially in a practically frictionless manner, thus facilitating the operation of the clutch in the action of releasing and engaging the same. The pilot member is also held very tightly against rotation relative to the cover plate. In this connection it will be appreciated that with the clutch disengaged as illustrated in Figs. 2 and 13, the pressure plate is more or less free to oscillate relative to the other driving members, except for the frictional control afforded by the facing 24a; however, such oscillation may take place within the limits of oscillation of the pilot member. For example, in the first form, the pilot is slidable on the ends of the yokes, and of course, some clearances are necessary for this purpose, and due to this clearance the pilot plate may be capable of some oscillation. This requires a very careful fitting of the parts. In the second form a close fitting of the parts is eliminated, and by the same token the opportunity for a binding action, due to an undue close fit or the like, is eliminated.

By way of example, it may be stated that tests made on one clutch of this type indicate that if the pilot ring is capable of oscillating through about .002 of an inch or more, measured on a radius at the median line of the friction facing 24, that objectionable noises occur; that where the oscillation is less than this, a silent operation is had. Accordingly, by mounting the pilot member by the means of the flexible plates close fitting and close tolerances are not encountered in this connection, and the matter of wear in use does not change the condition. In a clutch which has been tested the supporting plates have been tried having a thickness of .015 and a thickness of .020, and the oscillation with such plates was checked as at .0009 of an inch and .0003 respectively.

To accommodate these plates which are shown as being rectangular, the friction facing on the pilot member may be formed into several segments, as illustrated at 24a with the rivets 68 being taken through the pilot member in spaces between segments. These corrugated plates, however, need not be of rectangular shape but may be otherwise formed.

Figure 17:
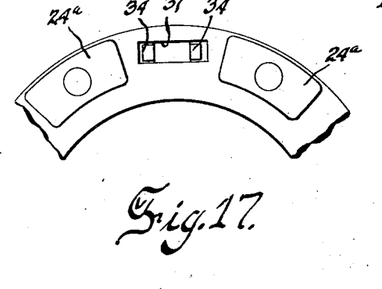
Fig. 17 is a fragmentary elevation of the pilot member.

With this structure the yoke mounting may be varied. The yoke structure may be substantially the same as that in the foregoing form with parts 34 extending through slots in the pilot member, but with a substantial circumferential clearance as illustrated in Fig. 17. This is done to hold the yoke against centrifugal force. When the parts are rotating the yokes and the levers carried thereby constitute unbalanced centrifugal forces which tend to swing the yokes outwardly. By extending the ends of the yokes through the apertures in the pilot member, the yoke is supported at opposite ends to resist these forces. Otherwise, the centrifugal forces would have to be overcome cantilever fashion at the end of the yoke mounted in the cover plate. In other words, the free ends of the yokes may swing outwardly centrifugally and abut against the outer wall of the apertures 31 in the pilot member. Also, the pilot member may serve to thus reenforce the yokes in the first mentioned form of the invention.

Since the yokes in the modified form do not serve as driving elements, they may be mounted differently than in the first form. Such a mounting is best illustrated in detail in Fig. 16 where opposed concavo-convex spring washers 70 are disposed between the cover plate and the yoke bodies. These washers may be partially collapsed by the holding nuts 71 which may advantageously be slightly rounded on the surface engaging the cover plate, and which may have a castellated formation as at 72. With this structure the free ends of the yokes more or less easily shift outwardly under centrifugal action by flexing of the spring washers, until the same comes into contact with the pilot member. This structure may also be utilized to bring the inner ends of the levers into a common plane. Thus, each lever may have an integral contact surface 73, and these surfaces may be brought into plane by the proper tightening of the several nuts 71. Of course, when centrifugal force causes the free ends of the yokes to abut against the pilot member, there may be a binding action on the pilot member, or at least friction is set up, but this would only be excessive at high speeds, whereas clutch operation is most usually performed at relatively low speeds.

Figure 18:
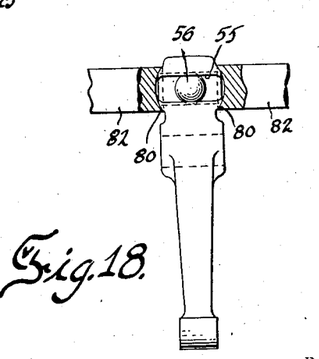
Fig. 18 is a detail view of a modified form of lever.
Figures 19, 20, 21, 22, 23:
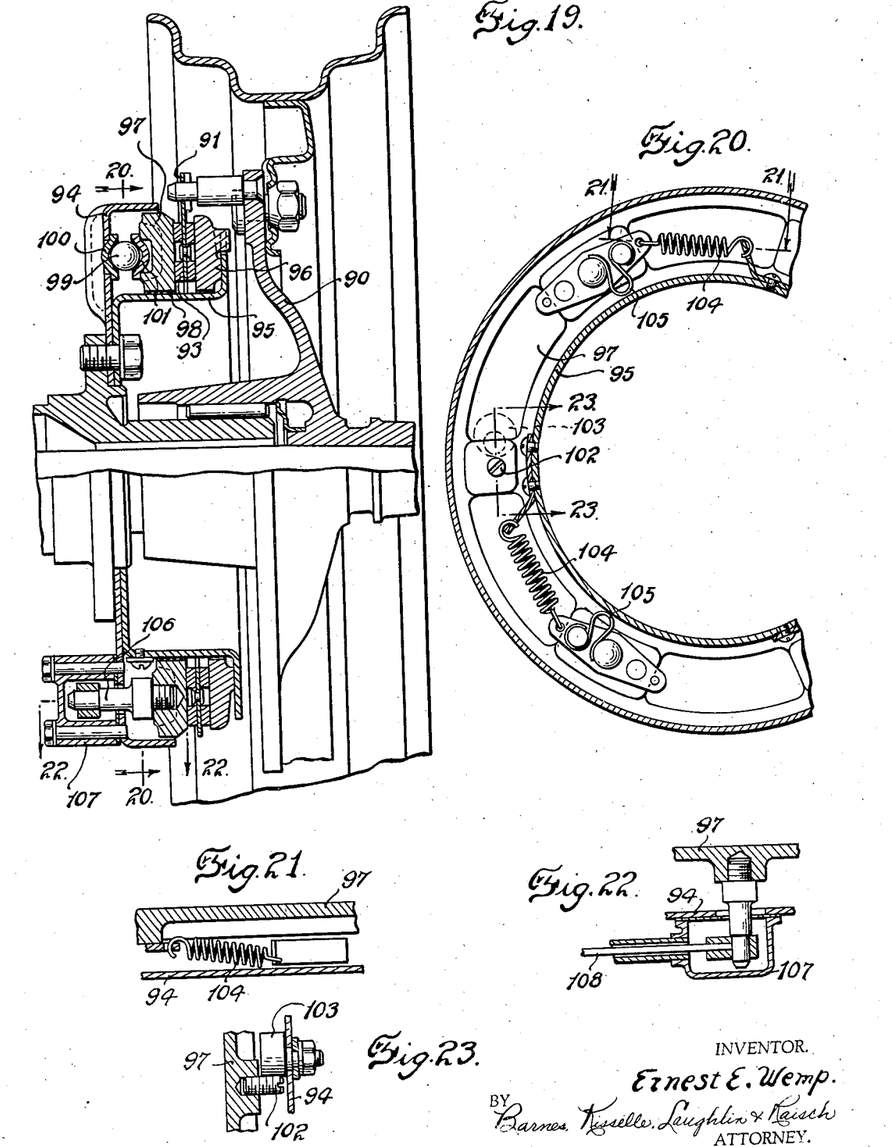
Fig. 19 is a sectional view taken through a wheel and brake structure showing the energizing feature applied to a brake.
Fig. 20 is a view taken substantially on line 20—20 of Fig. 19 showing the pressure plate and controlling spring arrangement.
Fig. 21 is a detailed sectional view taken substantially on line 21—21 of Fig. 20.
Fig. 22 is a sectional view showing the operating structure.
Fig. 23 is a view partially in section showing the stop arrangement.

A modified form of clutch lever structure is also shown, particularly with reference to the load end equipped with the ball 56. The lever may be initially provided with a collet formation 80 and which may be fashioned over by oppositely acting die members 82 for holding the balls permanently in position. The balls thus cannot escape out the ends of the groove 55 nor out of the side thereof, since the groove laps over more than half of the circumference of the ball. This facilitates assembly, as there is no chance for the balls to fall out of position. The lever may be formed by forming the load end so that a hole of 360 degrees extent may be drilled therethrough at the same time the lever is drilled for the reception of the fulcrum pins. Then part of the metal may be broached out, leaving only a portion of the aperture remaining, which portion constitutes the groove 55.

The clutch of this invention permits of the use of a clutch for a given installation having a considerable over-capacity, or in other words, a high safety factor. This can be done without objectionably increasing the spring pressure. There are certain variables in clutches such as variation in the coefficient of friction and variation in different kinds of lining material, etc. At times a vehicle may be stalled in the mud or deep sand and the engine raced to more or less jump the car out of location, thus applying both engine torque and kinetic energy. To take care of these conditions it is preferable that a clutch have sufficient over-capacity, but heretofore with the use of the ordinary clutch, using springs only, the over-capacity has been minimized as much as possible so as to keep the spring pressure down because the operator has to overcome this spring pressure to release the clutch. Obviously, the higher the spring pressure the harder it is to release the clutch. The cone angles in the present clutch may be selected to give the clutch such over-capacity as is desired without increasing the spring pressure. Accordingly, a high over-capacity clutch may be used, and at the same time easy clutch operation is maintained.

The same energizing principle is shown applied to brakes in Figs. 19 to 22. A vehicle wheel is shown at 90 having a friction member 91 secured thereto and which is equipped with friction facings 93. A back plate 94 and a carrier plate 95 are attached to the axle housing. The axle shown is a drive axle; the brake, however, is applicable to other axles and other wheel mountings. The carrier plate supports a friction ring 96 which may be visualized as corresponding to a clutch flywheel. The carrier plate also supports a pressure plate 97 so that it may oscillate on a bearing structure 98, and between the back plate 94 and pressure plate 97 are a plurality of balls 99 each pocketed in opposing recessed seat members 100 and 101. These seat members are preferably of conical recessed form with the differential angle as above described. The pressure plate has a stud 102 and the back plate has an abutment 103, and coil springs 104 which are connected to brackets on the carrier member and pressure plate as shown, hold the pressure plate with the stud 102 backed up against the stop 103. The springs 104 are positioned angularly with respect to the plane of rotation so that the springs also back the pressure plate away from the rotary member 91. Each ball may be acted upon by a small leaf spring 105 so that the balls are held somewhat snugly between the seats.

When the pressure plate is held thus retracted by the springs the brake is not effective and the balls lie between relatively deep portions of the opposing seats, although they are held snugly by the springs 105. To apply the brake, the pressure ring is shifted rotatably in the direction of rotation of the wheel, for which purpose the pressure plate has a stud 106 projecting into a housing 107 and which is connected to an operating member 108 which may be actuated by the foot of the operator through any suitable means such as mechanical or hydraulic means.

The particular brake structure is shown to demonstrate the applicability of the ball and ball seat energizing arrangement to brakes, and the particular brake structure is claimed in a separate application. When the brake is to be applied, the pressure plate is given a rotary movement with a very light pressure and small physical effort. This disaligns the cone seats and causes the balls to ride up the respective ramps and urge the pressure plate axially. When the pressure plate contacts with the rotary member 91, the rotary member is packed between the pressure plate and ring 96. Friction between the pressure plate and rotary member transmits torque to the pressure plate in the direction of applying the brakes, and as a result there is an energizing action which increases the braking pressure. The greater the torque absorbed, the greater the packing pressure. Due to the fact that the cone seats have a differential angle, all of the balls function to apply the brake so that there is a substantially uniform application of pressure throughout the circumferential extent of the pressure plate. When the forces applied to the operating member 108 are relieved, the springs 104 retract the pressure plate and release the brake. The brake pressure applied is under the control of the operator, as he may increase or decrease force applied to the operating member 108, with the resultant increase or decrease of the energizing action, much the same as the torque capacity of the clutch is under the control of the operator as set forth on page 5, col. 1. In the structure shown the member 91 which more or less corresponds to the driven disc of the clutch is shown as being the rotary member, whereas the remaining structure corresponding to the flywheel and pressure plate are stationary. Thus only the member 91 need be balanced for rotation.

In the brake structure shown, the energizing action occurs only in one direction of rotation. When applied to an automotive vehicle the arrangement of the energizing action preferably takes place when the vehicle is moving forwardly. In this case the pressure plate is shifted rotatably in the direction of rotation of the wheel to initially apply the brakes. When the vehicle is moving backwardly the brakes may be applied though the wheel is moving backwardly, and the brakes will be applied by reason of the balls rolling up the ramps of the seats, but there is no energizing action. However, an automotive vehicle is not backed up at high speeds, and adequate braking action may be obtained at this time, merely by the physical effort of the operator.

I claim:

1. In a clutch, a driving member, a pressure plate, a driven member between the driving member and pressure plate, clutch energizing means for packing the driving member, driven member and pressure plate together comprising, pairs of substantially mating ball seat members with facing conical recesses substantially immovably mounted on the pressure plate and driving member, a ball pocketed between each pair of mating ball seats, and separate means for urging each ball into contact with the inclined surfaces of the ball seats.

2. A clutch comprising, driving and driven members, spring means acting upon a driving member for packing the driving and driven members into frictional engagement, one of the said driving members being rockable relative to the other, and energizing means including roller elements confined between inclined surfaces upon which the roller elements function for increasing the packing engagement incident to the rocking of one driving member relative to the other, and means acting upon the roller elements and reacting against one of said members for maintaining the roller elements in contact with said inclined surfaces.

3. In a self-energizing clutch, two driving members and a driven member arranged to be packed together, one of said driving members being rockable relative to another incident to torque to which the clutch is submitted, energizing means for effecting clutch packing pressure upon said relative rocking, and friction means exerting a frictional controlling action between the two driving members to control the rocking movement in both directions to govern the energizing action.

4. In a self-energizing clutch, two driving members and a driven member arranged to be packed together, one of said driving members being rockable relative to another incident to torque to which the clutch is submitted, energizing means for effecting clutch packing pressure upon said relative rocking, and means frictionally inter-engaging the said two driving members for exerting a frictional controlling action on the relative rocking movement in both directions to govern the energizing action.

5. In a self-energizing clutch, a driving member, a second driving member, a driven member arranged to be packed between the driving members, means mounting the second driving member on the first so that the same is capable of rocking movement relative to the first, the rocking movement taking place incident to torque to which the clutch is submitted, energizing means including elements with inclined surfaces and roller elements functioning thereon for exerting a packing pressure upon rocking movement of the second driving member, and means rotatable with the first driving member for frictionally engaging the second driving member for governing the energizing action.

6. A clutch comprising, driving and driven members, spring means acting upon a driving member for packing driving and driven members into frictional engagement, one of said driving members being rockable relative to another driving member, said rockable member being relatively rockable by torque transmitted, energizing means for increasing the clutch packing pressure upon said relative rocking movement, and dampening means acting upon the relatively rockable member.

7. A clutch comprising, driving and driven members, spring means acting upon a driving member for packing driving and driven members into frictional engagement, one of said driving members being rockable relative to another driving member, said rockable member being relatively rockable by torque transmittted, energizing means for increasing the clutch packing pressure upon said relative rocking movement, and frictional dampening means resisting rocking movement of the rockable member.

8. A clutch comprising, driving and driven members, one of said driving members being rockable relative to another driving member, spring means for packing the driving and driven members into frictional engagement, means establishing a frictional contact between the spring means and the rockable member for frictionally controlling the rockable movements of said member, and means actuated by said relative rocking movement to increase the packing pressure over and above that provided by the springs.

9. A clutch comprising, driving and driven members, pilot means supported by one driving member for piloting a second driving member so that the same may shift axially and rotate relative to the first driving member, packing springs acting upon the pilot means, friction means providing a frictional engagement between the pilot means and the second driving member for exerting a frictional controlling action on the relative rotation of the second driving member, means for retracting the second driving member axially to disengage the clutch, and energizing means actuated by the relative rotary movement of the second driving member incident to the torque transmitted for increasing the packing pressure over and above that provided by the packing springs.

10. A clutch comprising, a driving member, a pressure plate, a driven member between the driving member and pressure plate, a pilot for the pressure plate non-rotatably and slidably carried by the driving member, said pressure plate being rotatable relative to the pilot and driving member, clutch packing springs acting upon the pilot, friction means between the pilot and pressure plate through which the springs act upon the pressure plate for packing the clutch into engagement, means for retracting the pressure plate and pilot against the action of the springs to release the clutch, and self-energizing means actuated by relative rotational movement of the pressure plate relative to the driving member substantially upon clutch engagement by the springs for urging the pressure plate axially to increase the clutch packing pressure.

11. A clutch comprising, a driving member, a pressure plate, a driven disc adapted to be packed between the driving member and pressure plate, means acting upon the pressure plate to pack the members into engagement, means comprising mating inclined surfaces, some on the pressure plate, some on the driving member, and including a roller element between the inclined surfaces for associating the pressure plate with the driving member, said pressure plate being rockable relative to the driving member incident to torque transmitted by the clutch whereby the roller element and inclined surfaces urge the pressure plate into tighter engagement with the driven member, and spring means acting upon the roller elements and normally holding them in contact with the said inclined surfaces.

12. A clutch comprising, a driving member, a pressure plate, a driven disc adapted to be packed between the driving member and pressure plate, packing means acting upon the pressure plate to pack the members into engagement, means comprising mating inclined surfaces, some on the pressure plate, some on the driving member, and including a roller element between the inclined surfaces for associating the pressure plate with the driving member, said pressure plate being rockable relative to the driving member incident to torque transmitted by the clutch whereby the roller element and inclined surfaces urge the pressure plate into tighter engagement with the driven member, and means acting upon the roller elements and normally holding them in contact with the said inclined surfaces.

13. A clutch comprising, a driving member, a pressure plate, a driven disc adapted to be packed between the driving member and pressure plate, clutch packing springs acting upon the pressure plate to pack the members into engagement, a plurality of sets of substantially mating conically recessed members, one set on the pressure plate and one set on the driving member, a roller element pocketed between each pair of mating members, said pressure plate being rockable relative to the driving member incident to the torque transmitted whereby the sets of mating members shift angularly and the roller elements function on the inclined surfaces thereof to apply a force to the pressure plate axially to increase the clutch packing pressure, a retainer for each roller element, and means acting upon each retainer normally urging the roller elements into contact with opposite inclined surfaces of said members whereby the roller elements are at all times held snugly positioned.

14. A clutch comprising, a driving member, a pressure plate, a driven disc adapted to be packed between the driving member and pressure plate, clutch packing springs acting upon the pressure plate to pack the members into engagement, a plurality of sets of substantially mating conically recessed members, one set on the pressure plate and one set on the driving member, a ball pocketed between each pair of mating members, said pressure plate being rockable relative to the driving member incident to the torque transmitted whereby the sets of mating members shift angularly and the balls function on the inclined surfaces thereof to apply a force to the pressure plate axially to increase the clutch packing pressure, a retainer for each ball, and means acting upon each retainer normally urging the ball into contact with opposite inclined surfaces of said members whereby the balls are at all times held snugly positioned.

15. In a pressure device of the kind described, a friction member, a second friction member capable of oscillation relative to the first friction member, a third friction member arranged to be packed between the first and second members, said third friction member and the said first and second friction members being relatively rotatable, means associating the first and second members and arranged to create packing pressure including substantially mating seat members, one fixed on the first friction member and one fixed on the second friction member, and each having a substantially straight contact surface inclined relative to the plane of relative rotation, and a ball between the said members and arranged to function on said contact surfaces simultaneously, said inclined contact surfaces, at the time of contact with the ball, being out of parallelism.

16. In a pressure device of the kind described, a friction member, a second friction member capable of oscillation relative to the first friction member, a third friction member arranged to be packed between the first and second members, said third friction member and the said first and second friction members being relatively rotatable, means associating the first and second members and arranged to create packing pressure including substantially mating seat members, one on the first friction member and one on the second friction member, and each having an inclined surface, and a ball between the said members and arranged to function on said surfaces, said inclined surfaces being on different angles, the differential of the angularity not exceeding the angle of repose for the material of the inclined surfaces and ball.

17. In a pressure device of the kind described having two members, a self-energizing structure comprising a pair of recessed ball seats having contact surfaces, one on one member and one on the other, said members being arranged for relative rotational movement, a ball pocketed between the ball seats and arranged to engage the surfaces, the angularity of the surfaces of one ball seat being different from such relative to the angularity of the surfaces of the other ball seat that lines along the said surfaces tangent to the ball at the points of contact are out of parallelism.

18. In a pressure device of the kind described, a friction member, another member capable of rotation relative to the first, mating ball seat members with facing recesses, a ball pocketed between the recesses and arranged to engage the surfaces thereof, the angularity of the surfaces of one ball seat being such relative to that of the surfaces of the other ball seat that lines along said surfaces tangent to the ball at the points of contact are at an angle to each other, and the said angle not exceeding the angle of repose of the material of the ball seats and ball.

19. In a pressure device of the kind described, a friction member, another friction member capable of rotation relative to the first, mating ball seat members with facing conical recesses, a ball pocketed between the recesses, the angularity of the conical surfaces of one ball seat being different from that of the other ball seat and the differential of the angularity not exceeding the angle of repose of the material of the ball seats and ball.

20. In a pressure device of the kind described, a pair of friction members, one of which is rotatable relative to the other, energizing means comprising, a pair of ball seat members with facing conical recesses, one on one friction member and one on the other, a ball pocketed between the ball seat members, there being a differential of angularity between the cone surfaces of the ball seats, and means for urging the ball into contact with the inclined surfaces of the ball seats.

21. In a pressure device of the kind described, a pair of friction members, one of which is rotatable relative to the other, energizing means comprising a pair of ball seat members with facing conical recesses, one on one member and one on the other, a ball pocketed between the ball seats, there being a differential of angularity between the cone surfaces of the ball seats, means for urging the balls into contact with the inclined surfaces of the seats, and said differential of angularity not exceeding the angle of repose of the material of the ball seats and ball.

22. In a pressure device of the kind described, a pair of pressure members, one of which is capable of rotary movement relative to the other, a set of conically recessed ball seats on one member and spaced circumferentially, a set of conically recessed ball seats on the other member and spaced circumferentially, said seats arranged in pairs, a ball pocketed between each pair of ball seats, means urging each ball into contact with the surfaces of the ball seats, the cone seats of one set being of an angularity different from the cone seats of the other set.

23. In a pressure device of the kind described, a pair of pressure members, one of which is capable of rotary movement relative to the other, a set of recessed ball seats on one member and spaced circumferentially, a set of recessed ball seats on the other member and spaced circumferentially, said seats arranged in pairs, a ball pocketed between each pair of ball seats, means urging each ball into contact with the conical surfaces of the ball seats, the seats of one set being of an angularity different from the cone seats of the other set, said differential in angularity not exceeding the angle of repose of the material of the balls and seats.

24. A self-energizing pressure device comprising, a friction member, a pressure plate, said pressure plate arranged for rotatable and axial movement relative to the friction member, a third member arranged to be packed between the friction member and pressure plate, the third member, and the pressure plate and friction member, being relatively rotatable, means for shifting the pressure plate into engagement with the third member, a plurality of conically recessed ball seats on the pressure plate and friction member and arranged in pairs, a ball pocketed between each pair of ball seats whereby relative rotation of the pressure plate causes the balls to function on the inclined surfaces of the seats to increase packing pressure, and means reacting on the friction member for backing the pressure plate away from and out of contact with the third member.

25. A clutch comprising, a driving member, a cover plate, a pressure plate, a driven member adapted to be packed between the driving member and pressure plate, a pilot member carried by the cover plate for centering and piloting the pressure plate, clutch packing springs acting upon the pilot member, friction material between the pilot member and pressure plate, a plurality of pairs of facing conically recessed ball seat members upon the pressure plate and cover plate, and a ball pocketed between each pair of mating ball seats.

26. A clutch comprising, a driving member, a cover plate, a pressure plate, a driven member adapted to be packed between the driving member and pressure plate, a pilot member carried by the cover plate for centering and piloting the pressure plate, clutch packing springs acting upon the pilot member, friction material between the pilot member and pressure plate, a plurality of pairs of facing conically recessed ball seat members upon the pressure plate and cover plate, a ball pocketed between each pair of ball seats, clutch releasing levers mounted on pivots supported by the cover plate, each lever having a load end, and antifriction means between the load ends of the levers contacting with surfaces carried by the pressure plate.

27. A clutch comprising, a driving member, a cover plate, a pressure plate rotatable relative to the driving member, a driven member adapted to be packed between the driving member and pressure plate, a pilot carried by the cover plate for centering and piloting the pressure plate, clutch packing springs acting upon the pilot, friction material between the pilot and the pressure plate, a plurality of pairs of facing conically recessed ball seat members on the pressure plate and cover plate, a ball pocketed between each pair of ball seats, and means for shifting the pressure plate axially to disengage the members from packed relation including antifriction means for communicating the releasing force to the pressure plate.

28. A clutch comprising, a driving member, a cover plate, a pressure plate, a driven member adapted to be packed between the driving member and pressure plate, a pilot member carried by the cover plate for centering and piloting the pressure plate, clutch packing springs acting upon the pilot member, friction material between the pilot member and pressure plate, a plurality of pairs of facing conically recessed ball seat members upon the pressure plate and cover plate, a ball pocketed between each pair of ball seats, and spring means acting upon the balls urging them into engagement with the converging surfaces of the conical recesses.

29. A clutch comprising, a driving member, a cover plate, a pressure plate, a driven member adapted to be packed between the driving member and pressure plate, a pilot member carried by the cover plate for centering and piloting the pressure plate, clutch packing springs acting upon the pilot member, friction material between the pilot member and pressure plate, a plurality of pairs of facing conically recessed ball seat members upon the pressure plate and cover plate, a ball pocketed between each pair of ball seats, and spring means acting upon the balls urging them radially outwardly into engagement with the converging surfaces of the conical recesses.

30. A clutch comprising, a driving member, a cover plate, a pressure plate, a driven member adapted to be packed between the driving member and pressure plate, a pilot member carried by the cover plate for centering and piloting the pressure plate, clutch packing springs acting upon the pilot member, friction material between the pilot member and pressure plate, a plurality of pairs of facing conically recessed ball seat members upon the pressure plate and cover plate, a ball pocketed between each pair of ball seats, spring means acting upon the balls urging them radially outwardly into engagement with the converging surfaces of the conical recesses, and clutch releasing levers pivotally carried by the cover plate and having an antifriction bearing contact with the pressure plate.

31. A clutch comprising, a driving member, a cover plate, a pressure plate, a driven member adapted to be packed between the driving member and pressure plate, lever supporting means rigidly carried by the cover plate, a pilot member carried by the lever supporting means and arranged to shift axially thereon and serving to pilot the pressure plate, friction material between the pilot member and pressure plate, clutch packing springs between the cover plate and pilot member for urging the clutch members into packing relation, a plurality of conically recessed ball seat members on the pressure plate and cover plate arranged in mating pairs, with the recesses facing each other, a ball pocketed between each mating pair of ball seat members, a retainer for each ball, spring means associated with each retainer and reacting upon a lever supporting means for urging the balls into contact with the inclined walls of the ball seats, whereby the pressure plate is capable of rotational movement relative to the cover plate so that the ball and ball seats create axial pressure on the pressure plate to increase the packing pressure, and clutch releasing levers pivotally mounted on the lever supporting means and having an antifriction bearing contact with the pressure plate.

32. A clutch comprising two driving members and a driven member, one driving member being axially and rotatably movable relative to the other, means for packing the members into engagement, means for shifting said one driving member axially to release the clutch, a plurality of pairs of recessed facing ball seats with one seat of each pair on one driving member and one seat on the other, a ball pocketed between each pair of ball seats, the arrangement being such that the transmitted torque causes the driving members to shift relative to each other rotatably whereby the ball and ball seat structure increases the packing pressure by an axial force on one of the driving members, the angularity of the recessed surfaces of the ball seats being arranged so that the mechanical advantage lies between the values of 2:1 and 3:1.

33. In a self-energizing clutch, a self-energizing structure comprising, substantially mating seat members arranged to oscillate relative to each other in accordance with the direction of applied torque, and each presenting inclined surfaces, a roller element disposed between the members, the roller element and surfaces of the members being maintained in substantial contact by a position of the roller eccentric of the deepest parts of the seat members for rolling action of the roller element along said surfaces as the members oscillate incident to torque reversal, whereby the roller element may move into wedging relation with the inclined surfaces without a bumping action.

34. In a self-energizing clutch, a self-energizing structure comprising, substantially mating seat members capable of relative oscillation upon torque reversal and each being recessed so as to present a substantially universal cam surface, the recesses of the members substantially facing each other, and a roller element disposed between the members, the roller element and cam surfaces maintained in substantial contact by a position of the roller element eccentric of the deepest parts of the recesses for rolling action of the rolling element on the said cam surfaces as the seat members oscillate, whereby the roller element may move into wedging relation with the cam surfaces without a bumping action.

35. In a self-energizing clutch, a self-energizing structure comprising, substantially mating seat members capable of relative oscillation upon torque reversal and each being recessed so as to present a substantially universal cam surface, the recesses of the members facing each other, and a ball disposed between the members and means for at all times tending to hold the ball and cam surfaces relatively eccentrically and in substantial contact for rolling action of the ball on the said cam surfaces as the seat members oscillate, whereby the ball may move into wedging relation with the cam surfaces without a bumping action.

36. In a self-energizing clutch, a self-energizing structure comprising, substantially mating conically recessed seat members with the recesses facing each other and arranged to oscillate relative to each other incident to torque reversals, a ball disposed between the seat members, and spring means for at all times tending to hold the ball and cone surfaces relatively eccentrically and in substantial contact for rolling action of the ball on said surfaces as the seat members oscillate, whereby the ball may move into wedging relation with opposed surfaces of the seat members without a bumping action.

37. In a self-energizing clutch, driving and driven members arranged to be packed together, one of said driving members being rockable relative to another incident to torque to which the clutch is submitted, energizing means for effecting clutch packing pressure upon said relative rocking, means frictionally engaging said one driving member for exerting frictional controlling action on its relative rocking movement, means for shifting said last named means axially for clutch release, and a plurality of flexible sheet metal members arranged circumferentially about the clutch and connected to a driving member and to said frictional engaging means for holding the frictional engaging means against relative rocking action.

38. In a self-energizing clutch, a driving member, a driven member, a second driving member rockable relative to the first driving member, said members arranged to be packed into driving relation, means for effecting clutch packing pressure incident to torque tending to rock said rockable driving member, a pilot for the rockable member, said pilot and rockable member being shiftable axially for clutch release and engagement, and a plurality of sheet metal plates arranged circumferentially about the axis of the clutch, and connected to the pilot and first mentioned driving member whereby to hold the pilot member centered, said plates being flexible to permit of said axial movement.

39. In a self-energizing clutch, a driving member, a driven member, a second driving member rockable relative to the first driving member, said members arranged to be packed into driving relation, means for effecting clutch packing pressure incident to torque tending to rock said rockable driving member, a pilot for the rockable member, said pilot frictionally engaging the rockable member whereby the friction action exerts a controlling function on the rocking movement, said pilot and rockable member being shiftable axially for clutch release and engagement, and a plurality of wavy sheet metal plates arranged circumferentially about the clutch axis and generally in the plane of rotation, the inner edges of the plates being connected to the pilot, and the outer being connected to the first driving member, said plates being flexible to permit of said axial movement.

40. In a self-energizing clutch, a driving member with a cover plate attached thereto, a second driving member rockable relative to the first and associated with the first through torque self-energizing means, a driven member, said members being arranged to be packed in driving relation, a pilot ring for the rockable member, spring means reacting against the cover plate and acting upon the rockable driving member through said pilot ring whereby the pilot ring frictionally engages the rockable member, means for shifting the rockable member and pilot ring axially for clutch disengagement, and a plurality of sheet metal plates disposed circumferentially about the clutch axis having inner portions connected to the pilot ring and outer portions connected to the cover plate, said sheet metal plates holding the pilot ring centered and being of wavy form to permit of axial movement of the pilot plate relative to the cover plate.

41. In a self-energizing clutch, a driving member with a cover plate attached thereto, a second driving member rockable relative to the first and associated with the first through torque self-energizing means, a driven member, said members being arranged to be packed in driving relation, a pilot ring for the rockable member, spring means reacting against the cover plate and acting upon the rockable driving member through said pilot ring, whereby the pilot ring frictionally engages the rockable member, means for shifting the rockable member and pilot ring axially for clutch disengagement, and a plurality of rectangular sheet metal plates disposed circumferentially about the clutch axis having inner portions connected to the pilot ring and outer portions connected to the cover plate, said sheet metal plates holding the pilot ring centered and being flexible to permit of axial movement of the pilot plate relative to the cover plate.

42. In a self-energizing clutch, a pair of driving members, one of which is rockable relative to the other for energizing purposes, a driven member, said members being arranged to be packed into driving relation, a pilot ring for piloting the rockable driving member and exerting a frictional action thereon, means for shifting the pilot ring and rockable driving member axially to release the clutch, a plurality of sheet metal plates spaced circumferentially around the clutch axis and connected to the other driving member and pilot ring for holding the pilot ring centered and against rotation relative to the said other driving member, said sheet metal plates being capable of lengthening and shortening to accommodate for the axial movement of the pilot ring.

43. In a clutch, driving and driven members arranged to be packed together, one of the driving members being shiftable axially for clutch release, clutch release levers, a support for each lever rockably secured at one end to one driving member, the opposite end of each support having a free slidable connection with a part appurtenant to the shiftable driving member, said supports when subjected to centrifugal force rocking on their mounting into engagement with said part, whereby the supports are held at opposite ends to resist centrifugal force.

44. In a clutch having driving and driven members arranged to be packed into driving relation, clutch releasing levers for releasing the clutch, a support for each lever bolted at one end to one driving member, spring means associated with the said bolted end whereby the supports are rockable, the other end of each support having a free slidable connection with an axially shiftable part of the clutch, said levers being mounted on the supports, said supports rocking into engagement with said part of the slidable connection to thereby be supported and centrifugal forces resisted.

45. In a clutch having driving and driven members arranged to be packed into driving relation, clutch releasing levers for releasing the clutch, a support for each lever bolted at one end to one driving member, spring means associated with the said bolted end whereby the supports are rockable, the other end of each support having a free slidable connection with an axially shiftable part of the clutch, said levers being mounted on the supports, said supports rocking into engagement with said part of the slidable connection to thereby be supported and centrifugal forces resisted, said spring means comprising opposed concavo-convex spring washers disposed between a shoulder on each support and the driving member to which the support is bolted.

46. In a power-transmitting mechanism, rotary driving and driven parts adapted to be placed under axial load for power-transmitting purposes and including a pressure member and a reactance member, the pressure member and reactance member being relatively rockable and having axially opening recesses with surfaces inclined relative to a radial plane and arranged in substantially mating pairs, a ball between each pair of recesses adapted to function on the surfaces upon relative rocking movement to load the mechanism, the angularity of the recess surfaces on pressure member and reactance member being different so that lines extended along said surfaces from the points of contact of the ball with the surfaces, at the time of the loading action, are out of parallelism.

47. In a power-transmitting mechanism, rotary driving and driven parts adapted to be placed under axial load for power-transmitting purposes and including a pressure member and a reactance member, the pressure member and reactance member being relatively rockable and having conical-like recesses arranged in substantially mating pairs, and a ball between each pair of recesses adapted to function on the surfaces thereof to load the mechanism, the angularity of the surfaces of the recesses on the members being such that lines extended along said surfaces from the points of contact of the ball with surfaces of the mating recesses, at the time of the leading action, are out of parallelism.

48. In a power-transmitting mechanism, rotary driving and driven parts adapted to be placed under axial load for power-transmitting purposes and including a pressure member and a reactance member, a plurality of means on the pressure member arranged substantially circumferentially thereon and presenting surfaces inclined relative to a radial plane, a plurality of means on the reactance member and arranged substantially circumferentially thereon and presenting surfaces inclined to a radial plane, said means on the pressure member and reactance member being disposed in substantially mating pairs, a ball between each mating pair of means arranged to function on said surfaces to load the driving and driven members by an axial force incident to relative rocking of the pressure member and reactance member, said balls arranged to transmit rotary motion from one of said members to the other, and the said means on the members being arranged so that all of said balls are in driving relation with said surfaces, notwithstanding the fact that one or more balls may wedge between surfaces and limit the relative rocking action.

49. In a power-transmitting mechanism, rotary driving and driven parts adapted to be placed under axial load for power-transmitting purposes and including a pressure member and a reactance member, a plurality of means on the pressure member arranged substantially circumferentially thereon and presenting surfaces inclined relative to a radial plane, a plurality of means on the reactance member and arranged substantially circumferentially thereon and presenting surfaces inclined to a radial plane, said means on the pressure member and reactance member being disposed in substantially mating pairs, a ball between each mating pair of means arranged to function on said surfaces to load the driving and driven members by an axial force incident to relative rocking of the pressure member and reactance member, said balls arranged to transmit rotary motion from one of said members to the other, and means for, at all times, holding the balls in contact with said surfaces, and the said means on the members being arranged so that all of said balls are in driving relation with said surfaces, notwithstanding the fact that one or more balls may wedge between surfaces and limit the relative rocking action.

50. Loading means for rotary power-transmitting mechanism comprising, two members rockable relative to each other and having recesses arranged in substantially mating pairs, a ball between each pair of recesses, said recesses each having a surface inclined relative to a radial plane and upon which surfaces the ball functions upon relative rocking movement of the members to exert an axial load on the mechanism, the angularity of the surface of one recess of each pair being such relative to the angularity of the surface of the mating recess, that lines extended along said surfaces from the points of contact of a ball with the surfaces and tangent to the ball at the points of contact, at the time of the axial loading, are out of parallelism.

ERNEST E. WEMP.